US007016930B2

(12) United States Patent
Hinds et al.

(10) Patent No.: US 7,016,930 B2
(45) Date of Patent: Mar. 21, 2006

(54) APPARATUS AND METHOD FOR PERFORMING OPERATIONS IMPLEMENTED BY ITERATIVE EXECUTION OF A RECURRENCE EQUATION

(75) Inventors: Christopher Neal Hinds, Austin, TX (US); Neil Burgess, Cardiff (GB)

(73) Assignee: ARM Limited, Cambridge (GB)

( * ) Notice: Subject to any disclaimer, the term of this patent is extended or adjusted under 35 U.S.C. 154(b) by 661 days.

(21) Appl. No.: 10/280,095

(22) Filed: Oct. 25, 2002

(65) Prior Publication Data
US 2004/0083255 A1    Apr. 29, 2004

(51) Int. Cl.
G06F 7/52    (2006.01)
G06F 7/38    (2006.01)

(52) U.S. Cl. ..................... 708/650; 708/605
(58) Field of Classification Search ............... 708/650, 708/605
See application file for complete search history.

(56) References Cited

U.S. PATENT DOCUMENTS

| | | | |
|---|---|---|---|
| 4,939,686 A | | 7/1990 | Fandrianto |
| 5,787,030 A | * | 7/1998 | Prabhu et al. .............. 708/605 |
| 5,798,955 A | * | 8/1998 | Matsubara .................. 708/605 |
| 6,115,733 A | * | 9/2000 | Oberman et al. ........... 708/605 |
| 2001/0010051 A1 | * | 7/2001 | Oberman et al. ........... 708/605 |

* cited by examiner

Primary Examiner—Tan V. Mai
(74) Attorney, Agent, or Firm—Nixon & Vanderhye P.C.

(57) ABSTRACT

The present invention provides an apparatus and method for performing an operation on an operand or operands in order to generate a result, in which the operation is implemented by iterative execution of a recurrence equation. In each iteration, execution of the recurrence equation causes a predetermined number of bits of the result and a residual to be generated, the residual generated in a previous iteration being used as an input for the current iteration, and in the first iteration the residual comprising the operand. The apparatus comprises result digit logic operable for a current iteration to determine, having regard to a most significant n bits of the input residual, a next result digit, and residual generation logic operable for a current iteration to generate, having regard to the input residual and the next result digit, a next residual, the most significant n bits of the next residual being generated in non-redundant form and the remaining bits of the next residual being generated in redundant form. Result update logic is also provided which is operable for a current iteration to modify the result, having regard to the next result digit, to produce an updated result. Control logic is then provided to cause the iterations to continue until a predetermined condition is met, whereafter the result is indicated by the updated result and any residual existing after the final iteration. In preferred embodiments, the apparatus is used to perform division operations and/or square root operations. The apparatus enables a significant reduction in the critical path of the primary iterative cycle used to execute the recurrence equation.

62 Claims, 9 Drawing Sheets

| ROW | QUOTIENT DIGIT | | | | |
|---|---|---|---|---|---|
| | −2 | −1 | 0 | +1 | +2 |
| 8/16..9/16 | −48..−25 | −24..−9 | −8..7 | 8..25 | 26..48 |
| 9/16..10/16 | −54..−29 | −28..−9 | −8..7 | 8..29 | 30..54 |
| 10/16..11/16 | −59..−31 | −30..−13 | −12..11 | 12..31 | 32..59 |
| 11/16..12/16 | −64..−33 | −32..−13 | −12..11 | 12..35 | 36..64 |
| 12/16..13/16 | −70..−37 | −36..−13 | −12..11 | 12..39 | 40..70 |
| 13/16..14/16 | −75..−41 | −40..−13 | −12..11 | 12..39 | 40..75 |
| 14/16..15/16 | −80..−45 | −44..−13 | −12..11 | 12..43 | 44..80 |
| 15/16..16/16 | −86..−49 | −48..−17 | −16..16 | 17..47 | 48..86 |

FIGURE 5

Upper PR non-redundant bit generation

APPARATUS AND METHOD FOR PERFORMING OPERATIONS IMPLEMENTED BY ITERATIVE EXECUTION OF A RECURRENCE EQUATION

BACKGROUND OF THE INVENTION

1. Field of the Invention

The present invention relates to an apparatus and method for performing operations implemented by iterative execution of a recurrence equation.

2. Description of the Background

There are a number of operations which can be implemented by iterative execution of a recurrence equation. In each iteration, execution of the recurrence equation causes a predetermined number of bits of the result of the operation to be generated, along with the generation of a residual. The residual generated in a previous iteration is used as an input for the current iteration. Hence, after each iteration, the result is updated to take account of the new result bits generated, and a new residual is output.

Typically, the recurrence equation is such that, as the number of iterations increases, the absolute value of the residual decreases. Accordingly, continued iterative execution of the recurrence equation will eventually result in the residual reducing to zero. Depending on the implementation, it is often considered unnecessary to continue iterative execution of the recurrence equation until the residual reduces to zero, and instead it is sufficient to merely perform a predetermined number of iterations that would typically ensure that the residual is less than or equal to some predetermined value, or alternatively to continue with the iterations until it is actually determined that the residual is less than or equal to a predetermined value.

It will be appreciated that there are a variety of operations which can be implemented by iterative execution of a recurrence equation. However, two common examples are division operations and square root operations. U.S. Pat. No. 4,939,686 describes a Radix 4 shared division and square root circuit.

When performing such operations within a data processing apparatus, it is typical to provide a primary iterative cycle containing the necessary logic to iteratively execute the recurrence equation. Considering the example of pipelined processors, this primary iterative cycle would typically be located within a particular pipelined stage of a particular pipeline. For example, in a pipelined processor containing multiple pipelines, a particular pipeline may be provided for performing operations such as division operations and square root operations, with that pipeline including a primary iterative cycle at a particular pipelined stage.

As mentioned earlier, the residual generated in a particular iteration needs to be used as the input for the next iteration. Typically, the residual is kept in a redundant form (for example a carry-save format) to reduce the cycle time required to compute the residual in a particular iteration. However, for at least one of the processing steps performed in each iteration, a certain number of bits of the residual need to be used in selecting the operation to be performed in this iteration. These bits may be required to be known in non-redundant form, and accordingly it is necessary in such situations to include some logic to convert those required bits from the redundant form into the non-redundant form, typically using a carry-propagate adder structure. It has been found that this conversion of certain bits from the redundant form into the non-redundant form is in the critical path of the iteration cycle, and hence limits the execution speed of the data processing apparatus.

This particular problem can be illustrating by way of example with reference to FIG. 1, which illustrates a typical primary iterative cycle that may be used when performing a division operation. As will be appreciated, a division operation is arranged to divide a dividend by a divisor. The dividend is routed to register 130, whilst the divisor is routed to register 110. In a first iteration, register 120 will be empty. Both the registers 120 and the registers 130 are arranged to store n+m bits.

The most significant n bits of registers 120 and 130 are passed to next quotient digit selector logic 140, whilst all bits of registers 120 and 130 are passed to carry-save adders 160. The logic provided within the next quotient digit select logic 140 is illustrated schematically in FIG. 2. As can be seen, an n-bit carry-propagate adder 200 is provided for receiving the n bits from both registers 120 and 130, and for producing an n-bit output in non-redundant form. As mentioned above, in the first iteration, register 120 will be empty, whilst register 130 will contain the dividend, which will already be in non-redundant form, and accordingly, the upper n bits of the dividend will be output from adder 200. The output of adder 200 is passed to a next quotient digit lookup table 210, which is arranged to determine based on the divisor stored in register 110 and the n-bits received from adder 200, a next quotient digit to be output as a control signal to multiplexer 150.

The next quotient digit specifies a multiplication factor to be applied to the divisor 110 in order to generate an update vector for outputting over path 155 to the carry-save adders 160. In the example illustrated in FIG. 1, the next quotient digit can have five possible values, namely −2, −1, 0, +1 and +2, and the multiplexer 150 is arranged to receive as inputs the values −2D, −1D, 0, +1D and +2D (where D denotes the divisor as stored in register 110). Accordingly, it can be seen that the next quotient digit output from logic 140 is used by the multiplexer 150 as a select signal to select the appropriate update vector to output over path 155 to the carry-save adders 160.

The carry-save adder 160 is arranged to generate a residual, which in the context of division operations will be referred to hereafter as a partial remainder, the partial remainder being generated from the contents of the registers 120 and 130 and the update vector received over path 155. The partial remainder as generated in redundant format is then routed back to registers 120, 130, with register 130 saving the carry bits of the partial remainder, and register 120 storing the save bits of the partial remainder. The partial remainder output by the carry-save adders 160 is also stored in redundant format in the register 170.

As can be seen from FIG. 1, the next quotient digit output from logic 140 is not only input to the multiplexer 150, but is also used to update the quotient value stored within the register 100, with that updated quotient value then being output to the register 190.

Accordingly, it can be seen that during each iteration, a next quotient digit is generated based on the most significant n bits of the partial remainder stored in the registers 120, 130, an update vector is then generated from that next quotient digit, and a new partial remainder is generated based on the previous partial remainder as stored in the registers 120, 130 and the update vector. In addition, the quotient is updated based on the next quotient digit.

At some point, for example after a predetermined number of iterations have been performed, the division operation will be deemed to be complete, at which point the result of the division operation will be given by the updated quotient stored within the register 190, and any final partial remainder stored within the register 170. Since the partial remainder stored within the register 170 will be in redundant format, carry-propagate adder 180 is provided for converting that final partial remainder into non-redundant form.

With the logic arranged as shown in FIG. 1, the following critical path is observed:

1. The upper bits of the partial remainder carry and save vectors are summed to a non-redundant form in carry-propagate adder 200;
2. A determination is made within the next quotient digit lookup table 210 of the next quotient digit based on the non-redundant upper partial remainder bits;
3. Selection is made via the multiplexer 150 of the update vector determined from the next quotient digit;
4. The update vector and the partial remainder carry and save vectors are summed in a redundant form within the carry-save adders 160;
5. The new partial remainder carry and save vectors are written to their respective registers 130, 120.

In parallel with step 4 above, the quotient is updated with the determined next quotient digit and written to the quotient register 100.

A timing diagram illustrating the timing of this critical path is illustrated in FIG. 9, this illustrating the sequence of the above five steps, preceded by an initial register read step.

It would be desirable to reduce the time taken for the above critical path, thereby facilitating an increase in processing speed of the data processing apparatus.

SUMMARY OF THE INVENTION

Viewed from a first aspect, the present invention provides a method of operating a data processing apparatus to perform a division operation to divide a dividend by a divisor, the division operation being implemented by iterative execution of a recurrence equation, in each iteration, execution of the recurrence equation causing a predetermined number of bits of a quotient, and a partial remainder, to be generated, the partial remainder generated in a previous iteration being used as an input for the current iteration, and in the first iteration the dividend forming the input partial remainder, the method comprising the steps of: (a) for a current iteration, (i) determining from the divisor and a most significant n bits of the input partial remainder a next quotient digit; (ii) generating, based on the input partial remainder, the divisor and the next quotient digit, a next partial remainder, the most significant n bits of the next partial remainder being generated in non-redundant form and the remaining bits of the next partial remainder being generated in redundant form; (iii) modifying the quotient, having regard to the next quotient digit, to produce an updated quotient; (b) iterating said steps (a)(i) to (a)(iii) until a predetermined condition is met, whereafter the result of the division operation is indicated by the updated quotient and any partial remainder existing after the final iteration.

In accordance with the present invention, the form of the partial remainder is modified to move the computation of the most significant n bits in non-redundant form to outside of the critical path. More particularly, for a current iteration, the step of generating the next partial remainder comprises generating, based on the input partial remainder, the divisor and the next quotient digit, the next partial remainder, with the most significant n bits of the next partial remainder being generated in non-redundant form, and the remaining bits of the next partial remainder being generated in redundant form. By taking this approach, the process is able for any particular iteration to determine the next quotient digit without requiring any preliminary step of determining the non-redundant form of the most significant n bits of the input partial remainder required in order to determine the next quotient digit.

Accordingly, by ensuring that during each iteration, the next partial remainder is generated with the most significant n-bit being specified directly in non-redundant form, it is possible to significantly reduce the time required to perform each iteration, thereby alleviating the above-described critical path problems of the prior art.

In any particular iteration, the partial remainder generated in a previous iteration is used as an input for the current iteration. However, in the first iteration, there will have been no partial remainder generated by a previous iteration, and so for the first iteration the dividend forms the input partial remainder. More particularly, during a first iteration, the method comprises the steps of: at said step (a)(i), determining from the divisor and a most significant n bits of the dividend a first quotient digit; at said step (a)(ii), generating, based on the dividend, the divisor and the first quotient digit, a partial remainder, the most significant n bits of the partial remainder being generated in non-redundant form and the remaining bits of the partial remainder being generated in redundant form; at said step (a)(iii), generating an initial quotient having regard to the first quotient digit.

It will be appreciated that in order to generate the next partial remainder, it is necessary to know the input partial remainder from the previous iteration, the divisor and the next quotient digit. At the start of a current iteration, the input partial remainder and the divisor will be known (the divisor being the same for all iterations) but the next quotient digit will not be available until the earlier described step (a)(i) has taken place. However, in preferred embodiments, at said step (a)(i) the next quotient digit is selected from a predetermined range of values, and said step (a)(ii) comprises the steps of: (1) generating, for each possible value of the next quotient digit, a candidate next partial remainder; and (2) selecting as the next partial remainder the candidate next partial remainder corresponding to the next quotient digit determined at said step (a)(i).

By splitting the step (a)(ii) into multiple stages, it is possible to begin execution of that processing step before the step (a)(i) has completed. More particularly, in preferred embodiments, the step (a)(ii)(1) is performed at least partially in parallel with said step (a)(i). This further increases the processing speed of each iteration by ensuring that by the time the next quotient digit has been determined, candidate next partial remainders are available for selection dependent on that next quotient digit.

It will be appreciated that a single logic unit could be provided for generating both the most significant n bits of the next partial remainder in non-redundant form and the generation of the remaining bits of the next partial remainder in redundant form. However, in preferred embodiments, said step (a)(ii) comprises the step of generating the most significant n bits of the next partial remainder in non-redundant form independently from the generation of the remaining bits of the next partial remainder in redundant form.

It will be appreciated that the redundant form can take a variety of formats. However, in preferred embodiments, the redundant form is a carry-save form, such that at said step (a)(ii) the remaining bits of the next partial remainder are generated as a sequence of carry and save bits, the method further comprising the step of storing the carry and save bits of the next partial remainder in carry and save registers, respectively, prior to said step (b). In such preferred embodiments, the method preferably further comprises the step of storing the most significant n bits of the next partial remainder in non-redundant form in the carry register prior to said step (b). However, it will be appreciated that the most significant n bits of the next partial remainder in non-redundant form could instead be stored within the save register if desired, or indeed within a separate register.

It will be appreciated that there are a number of ways in which the next quotient digit could be determined. However, in preferred embodiments, the step (a)(i) comprises the steps of selecting the next quotient digit from a predetermined range of values dependent on the divisor and the most significant n bits of the input partial remainder. In particular preferred embodiments, the selecting step is performed by selecting the next quotient digit from a lookup table.

Such a lookup table will typically require two inputs in order to determine the next quotient digit, namely an input specifying the divisor, and an input specifying the value of the most significant n-bits of the input partial remainder. However, with the aim of reducing the time taken to select the next quotient digit from the lookup table, the selecting step of preferred embodiments is performed by selecting the next quotient digit from a subset of the lookup table associated with the divisor, the subset specifying for each of a number of ranges of values of the most significant n bits of the input partial remainder a corresponding value for the next quotient digit. Accordingly, in such embodiments, the divisor is used in a preliminary set up stage to determine a subset of the lookup table that will be relevant for the particular division operation, and that subset is then referenced during each iteration rather than the entire lookup table. By taking such steps, it will be appreciated that the lookup process only then requires a single input, namely the value of the most significant n bits of the input partial remainder, and accordingly this significantly improves the speed of the lookup process.

It will be appreciated that the predetermined condition that is used to determine when to stop performing iterations of the recurrence equation can take a variety of forms. In one embodiment, the predetermined condition is that a predetermined number of iterations have been performed. For example, a decision could be taken that for division operations, a certain predetermined number of iterations will be all that is usually required to ensure that the partial remainder has reduced to a value that is acceptably small, for example zero or near zero. Alternatively, additional logic could be provided to assess whether the partial remainder is less than or equal to a predetermined value, for example zero or near zero, and in such situations the predetermined condition would be the determination that the partial remainder is less than or equal to such a predetermined value.

Viewed from a second aspect, the present invention provides a data processing apparatus operable to perform a division operation to divide a dividend by a divisor, the division operation being implemented by iterative execution of a recurrence equation, in each iteration, execution of the recurrence equation causing a predetermined number of bits of a quotient, and a partial remainder, to be generated, the partial remainder generated in a previous iteration being used as an input for the current iteration, and in the first iteration the dividend forming the input partial remainder, the data processing apparatus comprising: quotient digit logic operable for a current iteration to determine from the divisor and a most significant n bits of the input partial remainder a next quotient digit; partial remainder generation logic operable for a current iteration to generate, based on the input partial remainder, the divisor and the next quotient digit, a next partial remainder, the most significant n bits of the next partial remainder being generated in non-redundant form and the remaining bits of the next partial remainder being generated in redundant form; quotient update logic operable for a current iteration to modify the quotient, having regard to the next quotient digit, to produce an updated quotient; control logic operable to cause the iterations to continue until a predetermined condition is met, whereafter the result of the division operation is indicated by the updated quotient and any partial remainder existing after the final iteration.

In preferred embodiments, the partial remainder generation logic comprises first generation logic operable to generate the most significant n bits of the next partial remainder in non-redundant form, and second generation logic operable to generate the remaining bits of the next partial remainder in redundant form.

More particularly, in preferred embodiments, said first generation logic comprises first candidate generation logic operable to generate, for each possible value of the next quotient digit, candidate most significant n bits of the next partial remainder, and first selection logic operable to select as the most significant n bits of the next partial remainder the candidate most significant n bits of the next partial remainder corresponding to the next quotient digit determined by the quotient digit logic, and said second generation logic comprises second candidate generation logic operable to generate, for each possible value of the next quotient digit, candidate remaining bits of the next partial remainder, and second selection logic operable to select as the remaining bits of the next partial remainder the candidate remaining bits of the next partial remainder corresponding to the next quotient digit determined by the quotient digit logic.

In such preferred embodiments, the redundant form is preferably a carry-save form, such that said second generation logic is operable to generate the remaining bits of the next partial remainder as a sequence of carry and save bits, and the second candidate generation logic is a carry-save adder operable to generate the candidate remaining bits of the next partial remainder from the divisor and the carry and save bits of the partial remainder. It will be appreciated by those skilled in the art that the carry-save adder could be formed from any redundant adder structure that could receive either positively weighted or negatively weighted inputs, and generate any set of positive or negative weighted outputs, and accordingly any redundant form could be used (e.g. carry-save, carry-borrow).

It will be appreciated that the present invention is not only applicable to division operations, but is also applicable to square root operations. Accordingly, viewed from a third aspect, the present invention provides a method of operating a data processing apparatus to perform a square root operation on a radicand, the square root operation being implemented by iterative execution of a recurrence equation, in each iteration, execution of the recurrence equation causing a predetermined number of bits of a root, and a residual, to be generated, the residual and the root generated in a previous iteration being used as an input for the current iteration, and in the first iteration the radicand forming the input residual, the method comprising the steps of: (a) for a current iteration, (i) determining from a most significant n bits of the input residual and an indication of the current iteration a next root digit; (ii) generating, based on the input residual, the input root, the next root digit and an indication of the current iteration, a next residual, the most significant n bits of the next residual being generated in non-redundant form and the remaining bits of the next residual being generated in redundant form; (iii) modifying the root, having regard to the next root digit, to produce an updated root; (b) iterating said steps (a)(i) to (a)(iii) until a predetermined condition is met, whereafter the result of the square root operation is indicated by the updated root and any residual existing after the final iteration.

Again, it can be seen that by generating the next residual with the most significant n-bits being specified directly in non-redundant form, the determination of a next root digit during a particular iteration can occur without the requirement for any preliminary stage of determining the non-redundant form of the most significant n bits of the input residual required in such determination of the next root digit. In an analogous manner to that described earlier with respect to division operations, this significantly reduces the time required to perform each iteration, and hence alleviates the critical path problems described earlier.

When performing a square root operation, then during a first iteration the method preferably comprises the steps of: at said step (a)(i), setting a first root digit to a logic one value; at said step (a)(ii), generating, based on the radicand, the first root digit and an indication of the current iteration, a residual, the most significant n bits of the residual being generated in non-redundant form and the remaining bits of the residual being generated in redundant form; at said step (a)(iii), generating an initial root having regard to the first root digit.

In preferred embodiments, said step (a)(i) comprises the steps of selecting the next root digit from a lookup table, the lookup table comprising a plurality of rows, each row being arranged to specify for each of a number of ranges of values of the most significant n bits of the input residual a corresponding value for the next root digit.

In such embodiments, during a second iteration, the method preferably comprises the steps of: at said step (a)(i), selecting a predetermined row from the lookup table, and determining from the most significant n bits of the input residual the next root digit as indicated by that predetermined row.

Furthermore, in preferred embodiments, the method comprises, during a third iteration, the steps of: at said step (a)(i), selecting a row from the lookup table based on the value of the root digit determined for the preceding iteration, and determining from the most significant n bits of the input residual the next root digit as indicated by that selected row.

Then, during a fourth or subsequent iteration, the method preferably comprises the steps of: at said step (a)(i), selecting a row from the lookup table based on the value of the radicand, and determining from the most significant n bits of the input residual the next root digit as indicated by that selected row.

Viewed from a fourth aspect, the present invention provides a data processing apparatus operable to perform a square root operation on a radicand, the square root operation being implemented by iterative execution of a recurrence equation, in each iteration, execution of the recurrence equation causing a predetermined number of bits of a root, and a residual, to be generated, the residual and the root generated in a previous iteration being used as an input for the current iteration, and in the first iteration the radicand forming the input residual, the data processing apparatus comprising: root digit logic operable for a current iteration to determine from a most significant n bits of the input residual and an indication of the current iteration a next root digit; residual generation logic operable for a current iteration to generate, based on the input residual, the input root, the next root digit and an indication of the current iteration, a next residual, the most significant n bits of the next residual being generated in non-redundant form and the remaining bits of the next residual being generated in redundant form; root update logic operable for a current iteration to modify the root, having regard to the next root digit, to produce an updated root; control logic operable to cause the iterations to continue until a predetermined condition is met, whereafter the result of the square root operation is indicated by the updated root and any residual existing after the final iteration.

It will be appreciated that the present invention is not only applicable to division or square root operations, but is also applicable to other operations that may be implemented by iterative execution of a recurrence equation. Accordingly, in accordance with a fifth aspect of the present invention, the present invention provides a method of operating a data processing apparatus to perform an operation on an operand in order to generate a result, the operation being implemented by iterative execution of a recurrence equation, in each iteration, execution of the recurrence equation causing a predetermined number of bits of the result and a residual to be generated, the residual generated in a previous iteration being used as an input for the current iteration, and in the first iteration the residual comprising the operand, the method comprising the steps of: (a) for a current iteration, (i) determining, having regard to a most significant n bits of the input residual, a next result digit; (ii) generating, having regard to the input residual and the next result digit, a next residual, the most significant n bits of the next residual being generated in non-redundant form and the remaining bits of the next residual being generated in redundant form; (iii) modifying the result, having regard to the next result digit, to produce an updated result; (b) iterating said steps (a)(i) to (a)(iii) until a predetermined condition is met, whereafter the result is indicated by the updated result and any residual existing after the final iteration.

Again, it can be seen that by generating the next residual with the most significant n bits being specified directly in non-redundant form, it is possible for any particular iteration to determine the next result digit without needing to perform any preliminary computation to determine the non-redundant form of the most significant n bits of the input residual required to determine the next result digit. Accordingly, in an analogous manner to that described earlier with respect to division and square root operations, this enables a significant reduction in the time required to perform each iteration, thereby alleviating the earlier described critical path issues when performing operations implemented by iterative execution of a recurrence equation.

Viewed from a sixth aspect, the present invention provides a data processing apparatus operable to perform an operation on an operand in order to generate a result, the operation being implemented by iterative execution of a recurrence equation, in each iteration, execution of the recurrence equation causing a predetermined number of bits of the result and a residual to be generated, the residual generated in a previous iteration being used as an input for the current iteration, and in the first iteration the residual comprising the operand, the data processing apparatus comprising: result digit logic operable for a current iteration to determine, having regard to a most significant n bits of the input residual, a next result digit; residual generation logic operable for a current iteration to generate, having regard to the input residual and the next result digit, a next residual, the most significant n bits of the next residual being generated in non-redundant form and the remaining bits of the next residual being generated in redundant form; result update logic operable for a current iteration to modify the result, having regard to the next result digit, to produce an updated result; and control logic operable to cause the iterations to continue until a predetermined condition is met, whereafter the result is indicated by the updated result and any residual existing after the final iteration.

BRIEF DESCRIPTION OF THE DRAWINGS

The present invention will be described further, by way of example only, with reference to a preferred embodiment thereof as illustrated in the accompanying drawings, in which:

FIG. 5 is a diagram illustrating the contents of a lookup table used by the next quotient select logic of FIG. 3;

DESCRIPTION OF A PREFERRED EMBODIMENT

For the purposes of describing a preferred embodiment of the present invention, a data processing apparatus will be described which incorporates a primary iterative cycle capable of performing division or square root operations by iterative execution of a recurrence equation, the operands of the division or square root operations being specified as floating point numbers. The recurrence equations for a divide operation and a square root operation are as follows:

Divide $$R_{i+1} = r \cdot R_i - q_{i+1} D$$

Square Root $$R_{i+1} = r \cdot R_i - 2Q_i \cdot q_{i+1} - \frac{q_{i+1}^2}{r^{i+1}}$$

Figure 3:
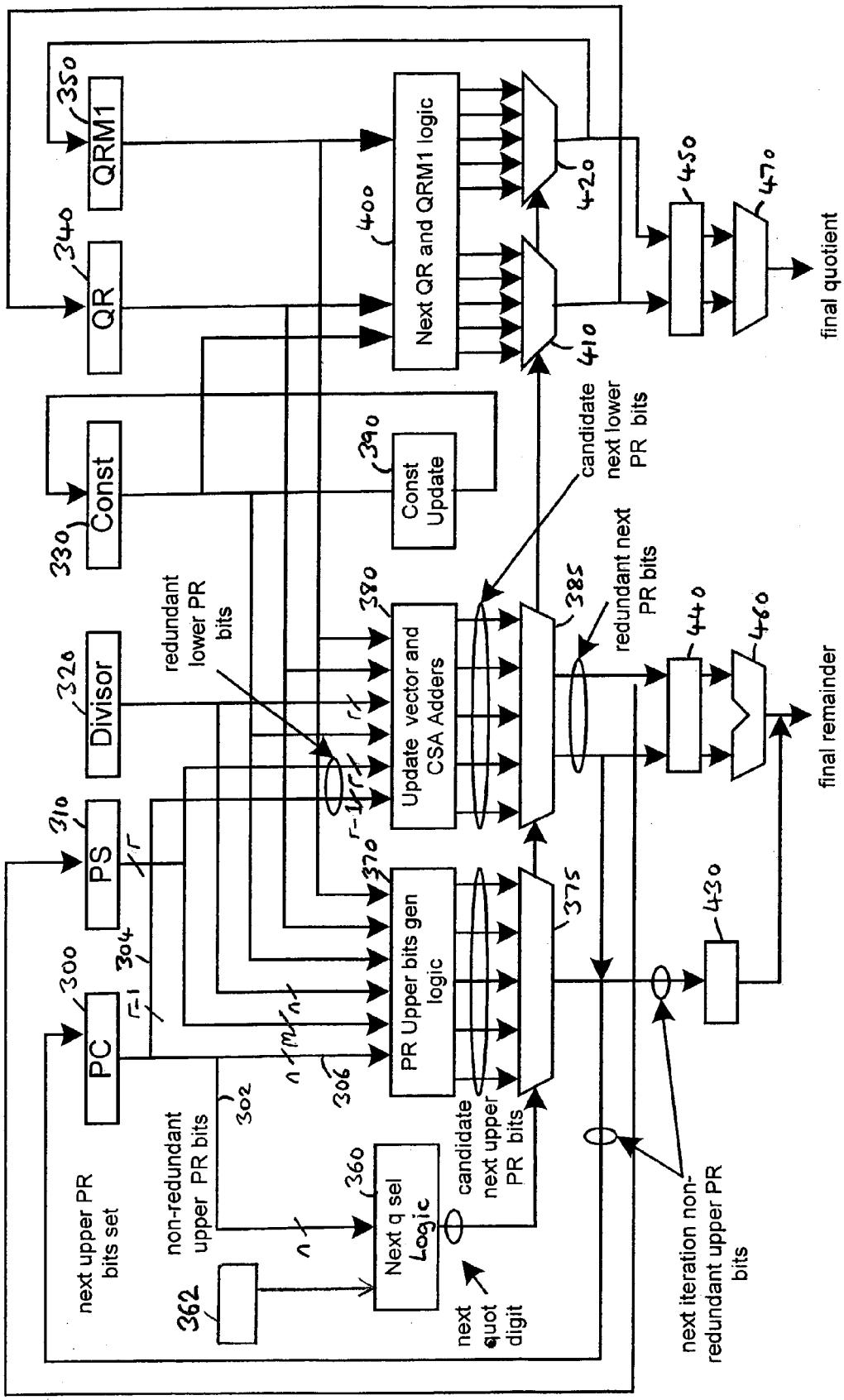
FIG. 3 is a block diagram illustrating the logic provided within the primary iterative cycle of a data processing apparatus in accordance with preferred embodiments of the present invention, to enable both division operations and square root operations to be performed by iterative execution of a recurrence equation.

Where:
$R_{i+1}$—next partial remainder/residual
$R_i$—current partial remainder/residual
r—radix (in the preferred embodiment this is 4)
$Q_x$—2x-bit root computed after the $x^{th}$ iteration
$q_{i+1}$—next quotient/root digit FIG. 3 is a block diagram illustrating the logic provided within the primary iterative cycle of a data processing apparatus in accordance with preferred embodiments of the present invention. In preferred embodiments, the data processing apparatus has a pipelined processor, which incorporates a particular pipeline for processing division operations and square root operations. The primary iterative cycle illustrated in FIG. 3 will be provided as one of the pipelined stages of that particular pipeline.

Registers 300 and 310 are provided for storing the partial remainder carry and save bits, respectively (for square root operations, the partial remainder being referred to as the residual). Register 320 is then provided to store the divisor for a division operation, whilst registers 330, 340 and 350 are used to store values required in the generation of the quotient (or the root in the case of a square root operation).

Within register 330, a value referred to as a "constant" is stored, in each iteration, this constant value being updated by the constant update logic 390. The constant value stored within the register 330 is a multi-bit value that has a single bit set to a logic one value, with the particular bit that is set to a logic one value being dependent on the iteration. Accordingly, it will be appreciated that the position of the logic one value within the constant value gives an indication of the current iteration and the purpose of the constant update logic 390 is to move the location of the logic one value as each iteration is performed. In preferred embodiments, the division and square root operations performed are Radix-4 operations, and accordingly the constant update logic 390 is arranged to move the position of the logic one value right by two bits on each iteration.

Registers 340 and 350 store the current quotient/root and the current quotient/root −1, respectively, during each iteration both values stored in the registers 340 and 350 being input to the next QR and QRM1 logic 400, along with the current constant value stored within the register 330. As will be appreciated by those skilled in the art, the purpose of the elements 330, 340, 350 and 400 is to enable "on the fly" rounding to be performed. In preferred embodiments, the next quotient/root digit generated by the next quotient select logic 360 can take one of five possible values, namely −2, −1, 0, +1 or +2, and the next QR and QRM1 logic 400 is arranged to produce five candidate QR values and five candidate QRM1 values given the five possible values of the next quotient/root digit. The five QR and QRM1 candidate values are output to multiplexers 410 and 420, respectively, with the output of those multiplexers being selected in dependence on the next quotient/root digit output from the next quotient select logic 360. The output values are then returned to the respective registers 340, 350, and in addition are stored within registers 450.

The operation of the circuitry of FIG. 3 for both division operations and square root operations will be discussed in turn. Beginning first with division operations, the dividend will initially be stored within the register 300, whilst the divisor will be stored within the register 320. During a first iteration, the upper n bits of the dividend will be routed both to the next quotient select logic 360 and the partial remainder upper bits generation logic 370. In preferred embodiments, n is equal to eight, but it will be appreciated that n could take other values dependent on the implementation.

In addition, the remaining bits of the dividend, namely the least significant r−1 bits of the dividend, are routed to the update vector and carry-save adders logic 380, as are the least significant r bits of the divisor 320. The upper n bits of the divisor are routed to the partial remainder upper bits generation logic 370.

As is apparent from FIG. 3, the contents of registers 330, 340 and 350 are also routed to both the partial remainder uppers bits generation logic 370 and the update vector and carry-save adders logic 380, but when performing division operations these bits are not used, and accordingly will not be discussed further at this time.

In preferred embodiments, the next quotient digit can take one of five values, namely −2, −1, 0, +1 or +2. For any particular iteration, the next quotient digit is selected based on the divisor and the most significant n bits of the input partial remainder, in the first iteration the dividend forming the input partial remainder.

In preferred embodiments, the next quotient digit is selected from a lookup table, FIG. 5 schematically illustrating the lookup table used in preferred embodiments. The value of the divisor determines which row of the table is applicable for the particular division operation. As shown in FIG. 5, the value of the divisor can be expressed as a fraction from $8/16$ to $16/16$, with the value of the divisor being determined by reviewing the mantissa of the divisor, with the most significant bit for this purpose being considered to be after the decimal point. Hence, as an example, if the most significant four bits of the mantissa of the divisor are 1001, then irrespective of the remaining bits of the mantissa, it will be appreciated that the divisor can be seen to exist within the range $9/16$ to $10/16$, and accordingly the second row of the table illustrated in FIG. 5 would be appropriate. Since the divisor does not change throughout the operation, then the same row will be relevant to each iteration, and accordingly as will be discussed with reference to FIG. 4, the contents of that single row will be preloaded into the next quotient select logic 360 from registers 362, such that the selection of the next quotient digit during any particular iteration can be determined directly from the value of the upper n bits of the partial remainder received over path 302 from register 300.

Figure 4:
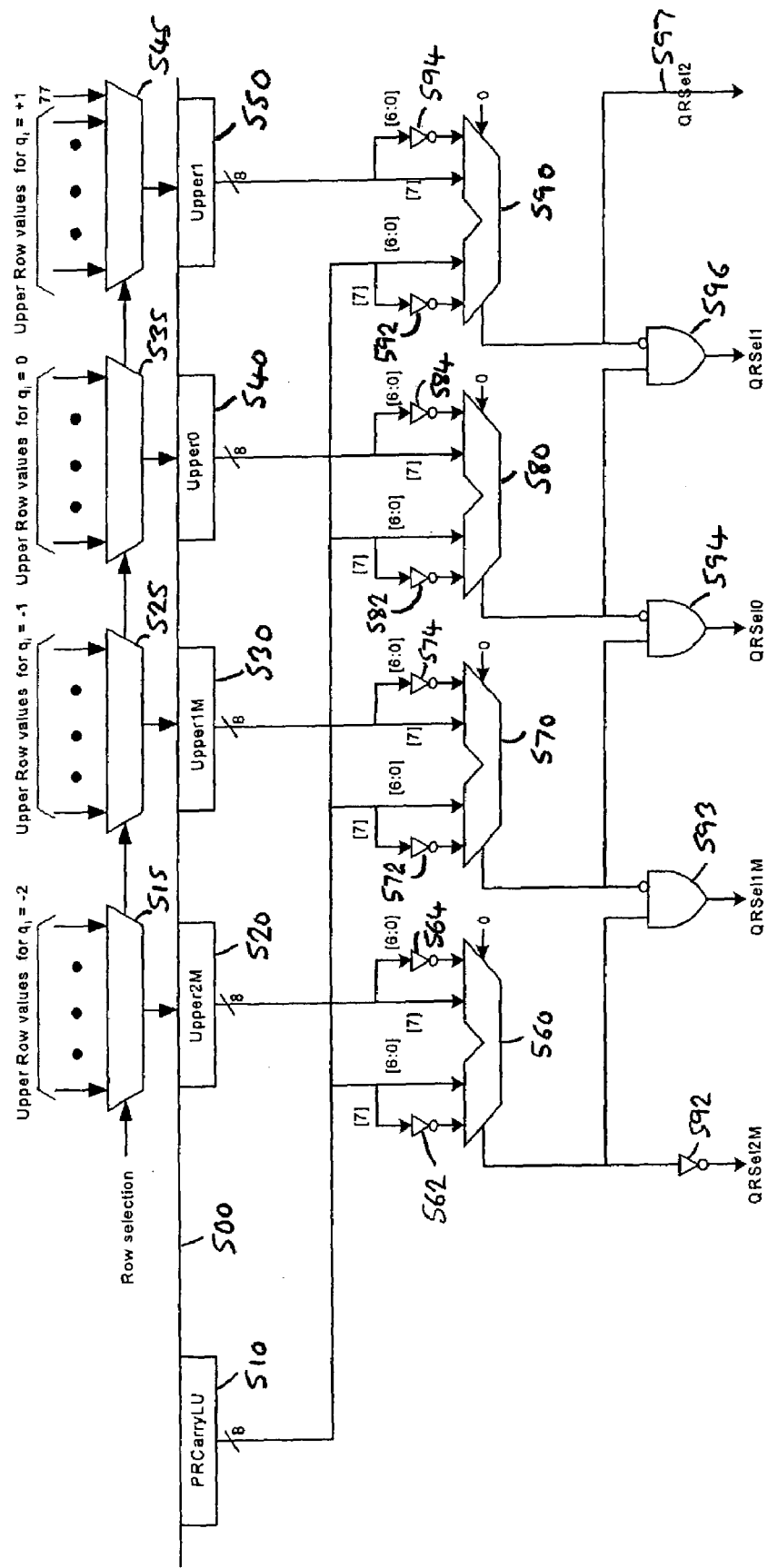
FIG. 4 is a block diagram providing more details of the logic provided within the next quotient select logic of FIG. 3.

FIG. 4 is a block diagram illustrating in more detail the contents of the next quotient select logic 360, the elements below the line 500 being provided within the next quotient select logic 360 (other than registers 520, 530, 540 and 550 which correspond to registers 362 in FIG. 3), whilst the elements above line 500 are provided in a previous pipelined stage. As can be seen from FIG. 4, in the previous pipelined stage, four multiplexers 515, 525, 535 and 545 are arranged to receive the upper row values for quotient digits of −2, −1, 0 and +1, respectively. Accordingly, by way of example with reference to FIG. 5, multiplexer 515 is arranged to receive as its eight inputs the values −25, −29, −31, −33, −37, −41, −45 and −49. A row selection control signal is then input into each multiplexer, in the instance of a division operation, this row selection control signal being derived from the divisor. This results in a single value being output from each multiplexer 515, 525, 535 and 545 into the registers 520, 530, 540 and 550, respectively. Accordingly, considering the earlier example where the divisor is determined to be in the range $9/16$ to $10/16$, then the registers 520, 530, 540 and 550 will receive the values −29, −9, 7 and 29, respectively. These values will remain unchanged for the duration of the division operation.

The non-redundant upper n bits of the partial remainder received over path 302 are stored in register 510. Associated with each register 520, 530, 540, 550 are adder circuits 560, 570, 580 and 590, respectively, which are arranged to receive the value from the corresponding register, and the value stored within the register 510. As can be seen from FIG. 4, the most significant bit of the value stored within the register 510 is inverted prior to input into each adder 560, 570, 580, 590 via corresponding inverters 562, 572, 582 and 592, respectively. The remaining bits of the value stored within the register 510 enter the adders unchanged. With regard to the values received from the registers 520, 530, 540 and 550, the most significant bit of these values is passed into the corresponding adder 560, 570, 580, 590, respectively, whilst the least significant seven bits are inverted via corresponding inverters 564, 574, 584, 594, respectively.

As will be appreciated by those skilled in the art, this results in the non-redundant partial remainder bits being compared using a two's complement comparison against the values in the registers 520, 530, 540, 550. If the partial remainder bits are greater than the value in a particular register, the carryout bit output by the corresponding adder will be set to a logic one value, whilst if the partial remainder bits are equal to or less than the value in that register, the carry-out bit will be set to a logic zero value.

The carry-out bit from adder 560 is inverted by inverter 592 in order to generate a signal indicative of whether the next quotient digit is −2. The carry-out bit from adder 560 is also routed to AND gate 593, which is further arranged to receive an inverted version of the carry-out bit from adder 570. Similarly, adder 594 receives the carry-out bit from adder 570 and an inverted version of the carry-out bit from adder 580, whilst AND gate 596 receives the carry-out bit from adder 580 and an inverted version of the carry-out bit from adder 590. The carry-out bit from adder 590 is also output over path 597 directly. This results in the generation of five signals, only one of which will be set to a logic one value to specify the value of the next quotient digit.

Accordingly, taking our earlier example of where the divisor is within the range $9/16$ to $10/16$, let it be assumed that the non-redundant upper partial remainder bits are of a value of −10. In this scenario, adder 560 will determine that the partial remainder bits are greater than the value in the register 520, and accordingly the carry-out bit from adder 560 will be set to a logic one value (i.e. −29), which will cause a logic zero value to be output from inverter 592. Adder 570 meanwhile will determine that the partial remainder value is less than the value stored within the register 330 (i.e. −9), and will accordingly generate a logic zero as a carry-out value, which is inverted prior to receipt by AND gate 593. This will cause the output from AND gate 593 to be at a logic one value, indicating that the next quotient digit is −1. It will also be seen that adders 580 and 590 will also produce a carry-out bit set to a logic zero level, and this will ensure that the outputs from AND gates 594 and 596, and the signal output on path 597 are all at a logic zero value.

The next quotient digit as determined by the next quotient select logic 360 will then be output to multiplexers 375, 385, 410 and 420 to enable appropriate selection of the various candidate signals generated by the PR upper bits generation logic 370, the update vector and carry-save adders logic 380, and the next QR and QRM1 logic 400.

The logic provided within the partial remainder upper bits generation logic 370 will now be described in more detail with reference to FIG. 6. Five multiplexers 600, 610, 620, 630 and 640 are provided (one for each possible value of the next quotient digit), which each receive two update vectors, one relevant to division operations and one relevant to square root operations. For division operations, the update vectors will be −2D, −1D, 0, +1D and +2D, where D is the divisor. In preferred embodiments, it is sufficient for computing the next quotient digit for only partial update vectors to be computed within logic 370 based on the upper n bits of the divisor received from register 320. Update vectors for square root operations will be described later. A signal indicative of whether the operation is a division operation or a square root operation is input to each of the multiplexers, resulting in the multiplexers outputting the appropriate update vectors associated with each of the possible values of the next quotient digit. These update vectors are then input to corresponding carry-propagate adders 650, 660, 670, 680 and 690, along with the upper n bits in the carry register 300, and the upper m bits within the save register 310.

Each carry-propagate adder is arranged to generate a corresponding candidate next upper partial remainder bits in non-redundant form with the output from each of the carry propagate adders 650, 660, 670, 680 and 690 being routed to the multiplexer 375. More details of the construction of each carry-propagate adder will now be provided with reference to FIG. 7.

Figure 7:
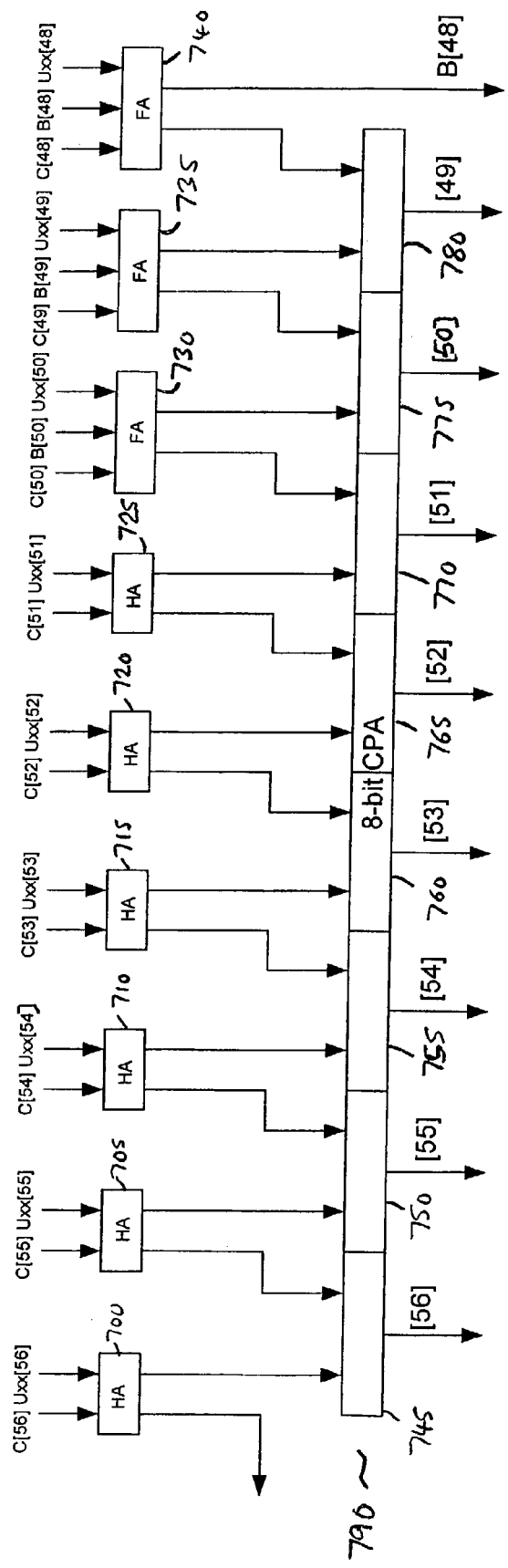
FIG. 7 illustrates in more detail the logic provided within a carry-propagate adder of FIG. 6.

Six half adders 700, 705, 710, 715, 720 and 725 are provided which are arranged to receive bits [56:51] from carry register 300 and the most significant six bits of the update vector, and to generate inputs into an 8-bit carry-propagate adder 790 as shown in FIG. 7. Three full adders 730, 735 and 740 are then provided, which each receive a corresponding next significant bit from the carry register 300, the save register 310, and the update vector. In the diagram illustrated in FIG. 7, the save bits are denoted by the numeral "B", since in preferred embodiments the actual carry-save format used is a carry-borrow format. Again, the outputs of the full adders 730, 735 and 740 are input to the carry-propagate adder 790 as illustrated in FIG. 7. Bit 48 output by the full adder 740 is in redundant form, whilst the eight bits output by the elements 745, 750, 755, 760, 765, 770, 775 and 780 of the carry-propagate adder 790 form the candidate next upper partial remainder bits in non-redundant from. Hence, the partial remainder upper bits generation logic 370 outputs the candidate next upper partial remainder bits consisting of 8 bits in non-redundant form, along with the most significant borrow bit (bit 48) in redundant form.

As is apparent from FIG. 7, the value of m in preferred embodiments is 3, in that the upper three bits of the save value saved within the save register 310 are input into the PR upper bits generation logic 370.

The logic of FIG. 7 is repeated for each of the carry-propagate adders 650, 660, 680 and 690. However, for the carry-propagate adder 670 which is associated with a next quotient digit of zero, it will be appreciated that the update vector for the division operation will also be zero, and that accordingly there is no need for the six half adders 700, 705, 710, 715, 720, 725, and the construction of the full adders 730, 735, 740 can be simplified.

Figure 1:
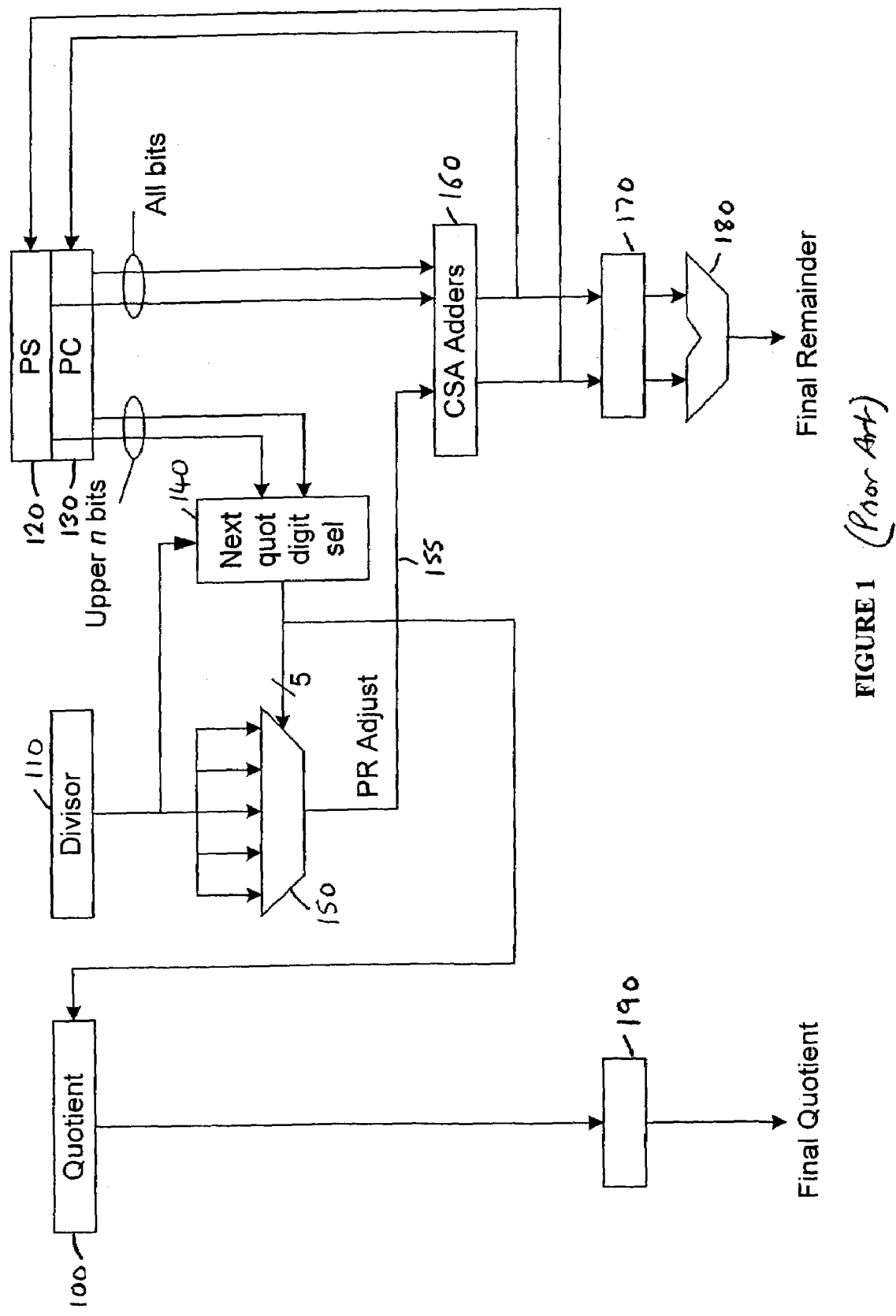
FIG. 1 is a block diagram illustrating logic provided within the primary iterative cycle of a prior art data processing apparatus in order to perform a division operation by iterative execution of a recurrence equation.
Figure 2:
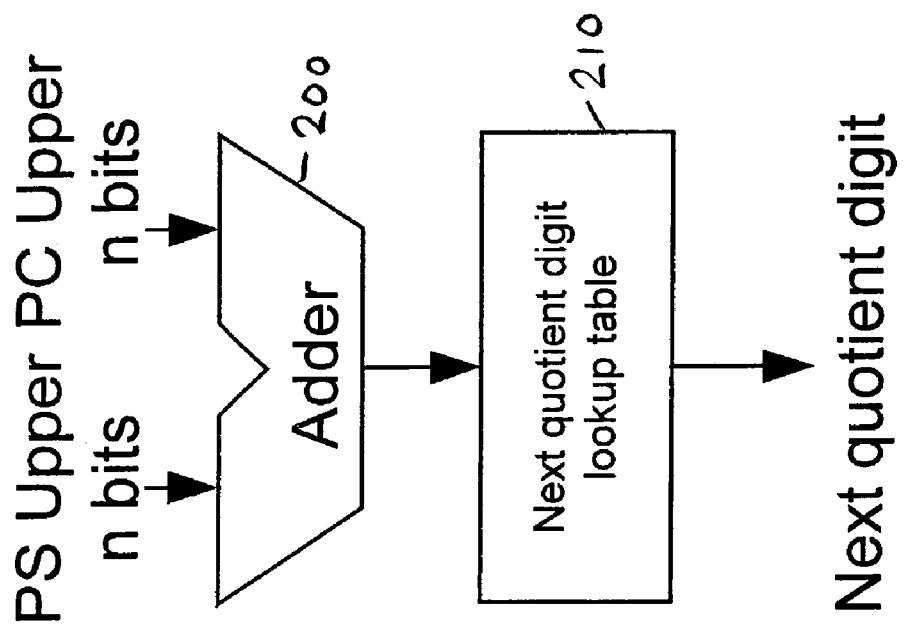
FIG. 2 is a block diagram illustrating the elements provided within the next quotient digit select logic of FIG. 1.
Figure 8:
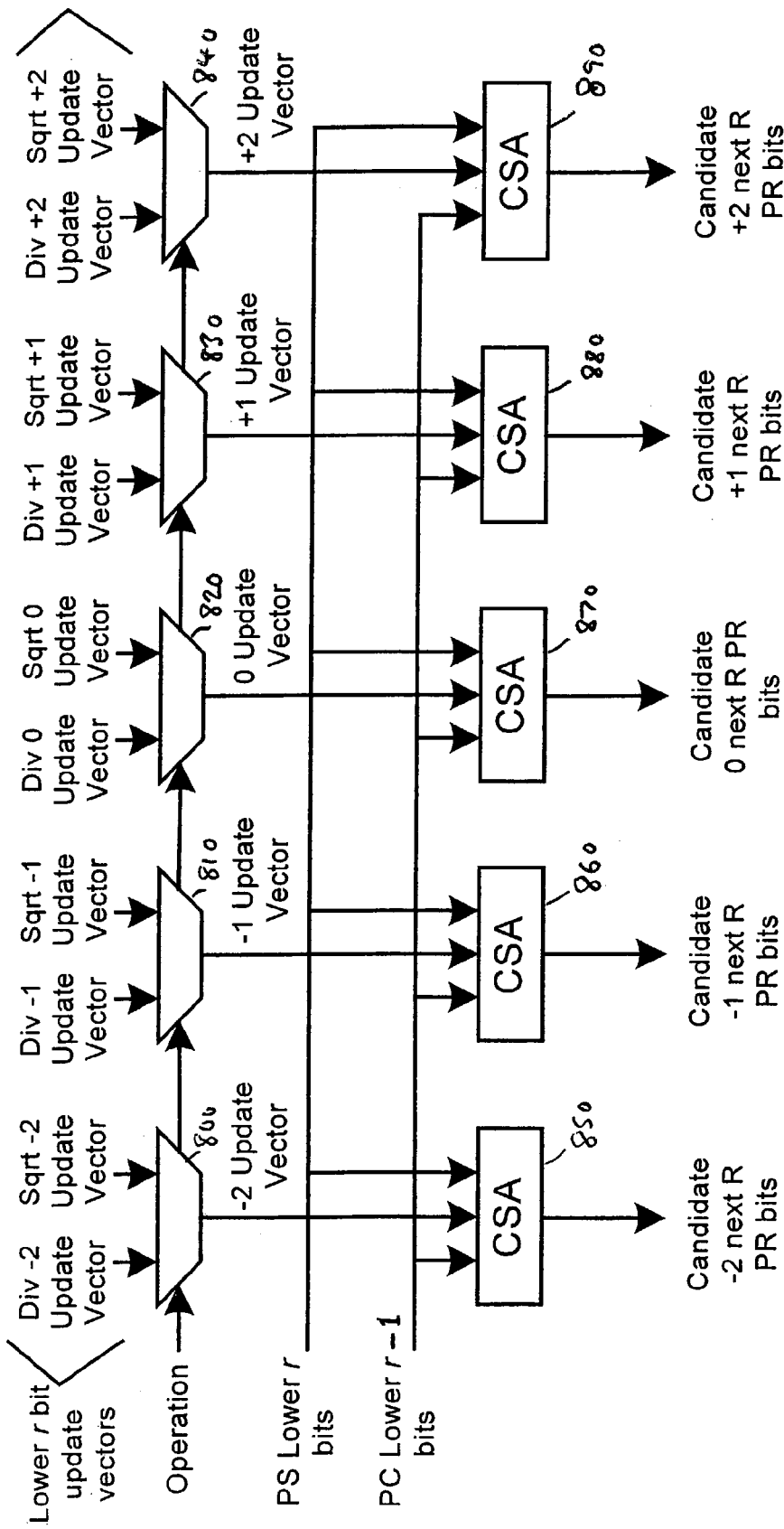
FIG. 8 is a diagram illustrating the logic provided within the update vector and carry-save adders logic of FIG. 3.

FIG. 8 is a diagram illustrating in more detail the elements provided within the update vector and carry-save adders logic 380 of preferred embodiments. As is apparent from FIG. 8, the construction is similar to that of the partial remainder upper bits generation logic 370, in that five multiplexers 800, 810, 820, 830 and 840 are arranged to receive the update vectors relevant for both division operations and square root operations for the five possible values of the next quotient digit, with the selection of the appropriate update vector occurring via a control signal input to those multiplexers indicative of whether the operation is in fact a division operation or a square root operation. Associated with each of the multiplexers 800, 810, 820, 830 and 840 is a corresponding carry-save adder 850, 860, 870, 880, 890, respectively, each carry-save adder being arranged to receive the update vector from the corresponding multiplexer, along with the lower r−1 bits from the carry register 300 and the lower r bits from the save register 310. The r−1 carry bits are shifted one place left and the open LSB bit position is used to add 1 when the update vector is negative. Each carry-save adder works in an analogous manner to that of the prior art carry-save adders logic 160 shown in FIG. 1, and accordingly generates a candidate next remaining partial remainder bits in redundant form with the appropriate next remaining partial remainder bits being selected by the multiplexer 385 dependent on the actual next quotient digit determined by the next quotient select logic 360.

Returning to FIG. 3, it can hence be seen that during each iteration, a next quotient digit is determined by the next quotient select logic 360, and this is used by multiplexers 375 and 385 to select the upper n bits of the next partial remainder in non-redundant form and the remaining bits of the next partial remainder in redundant form. This data is then routed back to the carry register 300 and the save register 310, with the carry register storing the lower r carry bits of the next partial remainder and the upper n bits, and the save register 310 storing the r save bits of the next partial remainder. The lower r bits are stored in redundant form and the upper n bits are stored in non-redundant form. Hence, at the end of a first iteration, the dividend originally stored within carry register 300 will be overwritten with the next partial remainder information, and for a subsequent iteration that partial remainder information will be used as an input. In the final iteration, register 430 is used to store the most significant n bits of the next partial remainder in non-redundant form, whilst the register 440 is used to store the remaining bits of the next partial remainder in redundant form.

After a certain number of iterations, the division operation will be determined to have completed, at which point the result will be given by a final quotient value and a final remainder value. The final quotient value will be selected by the multiplexer 470 from the QR and QRM1 values stored in register 450 in the conventional manner, whilst the final remainder will be given by the contents of registers 430 and 440. Since the contents of register 440 are still in redundant form, a carry-propagate adder 460 is provided to convert the remaining bits of the final remainder into non-redundant form.

Figure 9:
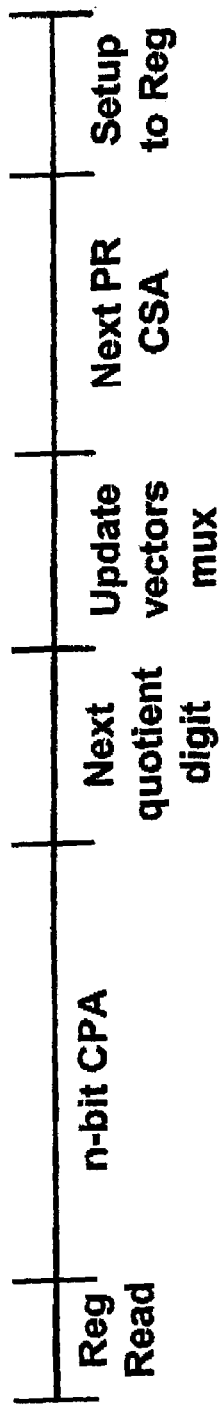
FIG. 9 is a timing diagram illustrating the time taken to perform an iteration in accordance with the prior art structure of FIG. 1.
Figure 10:
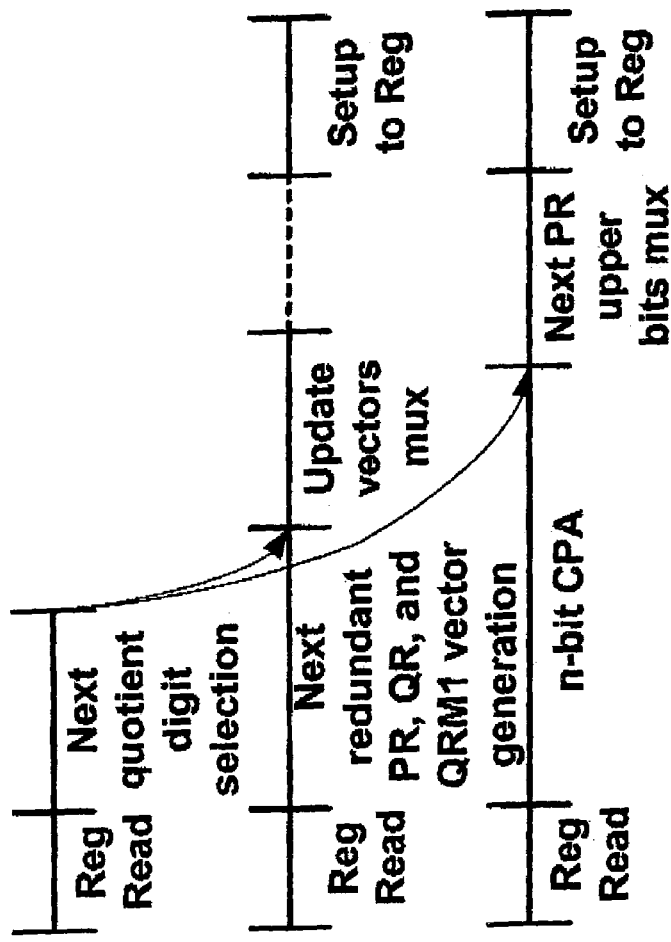
FIG. 10 is a timing diagram illustrating the time taken to perform an iteration in accordance with the logic of preferred embodiments as illustrated in FIG. 3.

FIG. 10 is a timing diagram illustrating the timing of the various processes performed in each iteration. By comparison of FIG. 10 with FIG. 9, it can be seen that the time taken for each iteration is significantly less than that observed when using the prior art approach illustrated schematically in FIG. 1. Looking in more detail at FIG. 10, it can been seen that the next quotient digit selection can take place whilst the redundant next partial remainder update vector and CSA adders logic 380, the constant update logic 390 and the next QR and QRM1 logic 400 are performing the processing described earlier. In addition, the n-bit carry-propagate adder process performed within the partial remainder upper bits generation logic 370 in order to generate the upper n bits of the next partial remainder in non-redundant form can also take place in parallel with the generation of the next quotient digit.

As can be seen from the timing diagram of FIG. 10, the next quotient digit has been selected by the time the multiplexer 385, also referred to herein as the partial remainder update vector mux, is ready to select the appropriate remaining bits of the next partial remainder in redundant form. The next QR and QRM1 vectors are also computed in parallel with the next quotient digit selection and are selected by the next quotient digit using muxes 410 and 420. These update vector multiplexers will typically be quite large, resulting in the majority of the time required for the muxing operation being in the buffering and driving of the select signal. This is common to both the timing diagram of FIG. 10 and the timing diagram of FIG. 9. However, the selection of the upper n bits of the next partial remainder in non-redundant form by the next PR upper bits multiplexer 375 will require less time since the buffering of the next quotient digit for the partial remainder update vector mux 385 has completed before it is required by the next PR upper bits mux 375. It can be seen that the time required to complete the primary iterative path and the time required to compute the next non-redundant upper partial remainder bits is fairly well balanced, at the end of which the process of setting up the next values in the registers takes place.

As can be seen from the above description of the apparatus of preferred embodiments, the form of the partial remainder is modified to move the computation of the non-redundant uppers bits to a position outside of the critical path. As discussed, the partial remainder is formed with bits [56:51] stored in the partial remainder carry register 300 in non-redundant form, and with the remaining bits of the partial remainder carry and save vectors being kept in redundant form and stored in the registers 300, 310. With the logic arranged as shown in FIG. 3, the following critical path is then observed:

1. Register read of the upper bits of the partial remainder carry vector;
2. The upper bits of the partial remainder carry and sum vectors and upper bits of the division are used directly in the determination of the non-redundant partial remainder update vectors;
3. Selection is made of the upper n bits of the next partial remainder in non-redundant form by the multiplexer 375;
4. The new partial remainder upper n non-redundant bits are written to the register 300.

In parallel with step 2 above, the lower r bits of the next partial remainder in redundant form are computed for all five possible cases of the next quotient digit. In parallel with step 2 above, the determination of the next quotient digit is made.

Given the above description, it will be appreciated that the logic as shown in FIG. 3 enables a significant reduction in the critical path timing of each iteration, thereby facilitating an increase in the processing speed of the data processing apparatus.

Having discussed the division operation in detail, the different steps involved when using the apparatus of FIG. 3 to perform a square root operation will now be discussed. As will be appreciated by those skilled in the art, a square root operation is applied to a radicand in order to produce a root and a residual. As with other recurrence equations, as the number of iterations increases, the absolute value of the residual decreases. At the end of each iteration, the current value of the root will be stored in register 340 and the current value of the root −1 will be stored in the register 350. As discussed earlier, the value stored within the constant register 330 gives an indication of the iteration. When performing square root operations, the values stored in each of these registers are input to both the partial remainder upper bits generation logic 370 (which for square root operations can be considered as the residual upper bits generation logic) and to the update vector and carry-save adders logic 380 used to generate the lower bits of the residual in redundant form. The next quotient select logic 360 is arranged during each iteration to generate a next root digit. At the start of the first iteration, the radicand will be stored within the carry register 300.

During the first iteration, irrespective of the value of the radicand, the next quotient select logic 360 is arranged to set the first root digit to a logic one value. Considering FIG. 4, it will be appreciated that this can be achieved by ensuring that the multiplexers 515, 525 and 535 are arranged to have one input, which is set to a value smaller than the smallest possible value of the radicand (in preferred embodiments zero), whilst the multiplexer 545 has an input set to a value greater than the largest possible value of the radicand for the multiplexer 545. As can be seen from FIG. 4, this input for the multiplexer 545 is shown as having the value 77, which in preferred embodiments is larger than any possible value of the radicand.

The row selection signal then ensures that these values are passed to the corresponding registers 520, 530, 540, 550 in the cycle before the first iteration. This results in registers 520, 530 and 540 storing a value that is certain to be less than the radicand, whilst the register 550 stores a value which is certain to be greater than the radicand. As will be appreciated from the earlier description of FIG. 4, this will ensure that only the AND gate 596 produces a logic one output, thereby setting the first root digit to a logic one value (the upper 8 bits of the radicand having been stored in register 510 for the first iteration).

As can be seen from FIG. 3, both the upper bits generation logic 370 and the update vector and carry-save adders logic 380 are arranged to receive the values in the constant register 330, the QR register 340 and the QRM1 register 350, and these values are used to generate the update vectors for each possible value of the next root digit. The update vector for a square root operation is given by the equation:

$$2Q_i \bullet q_{i+1} + \frac{q_{i+1}^2}{r^{i+1}}$$

Figure 6:
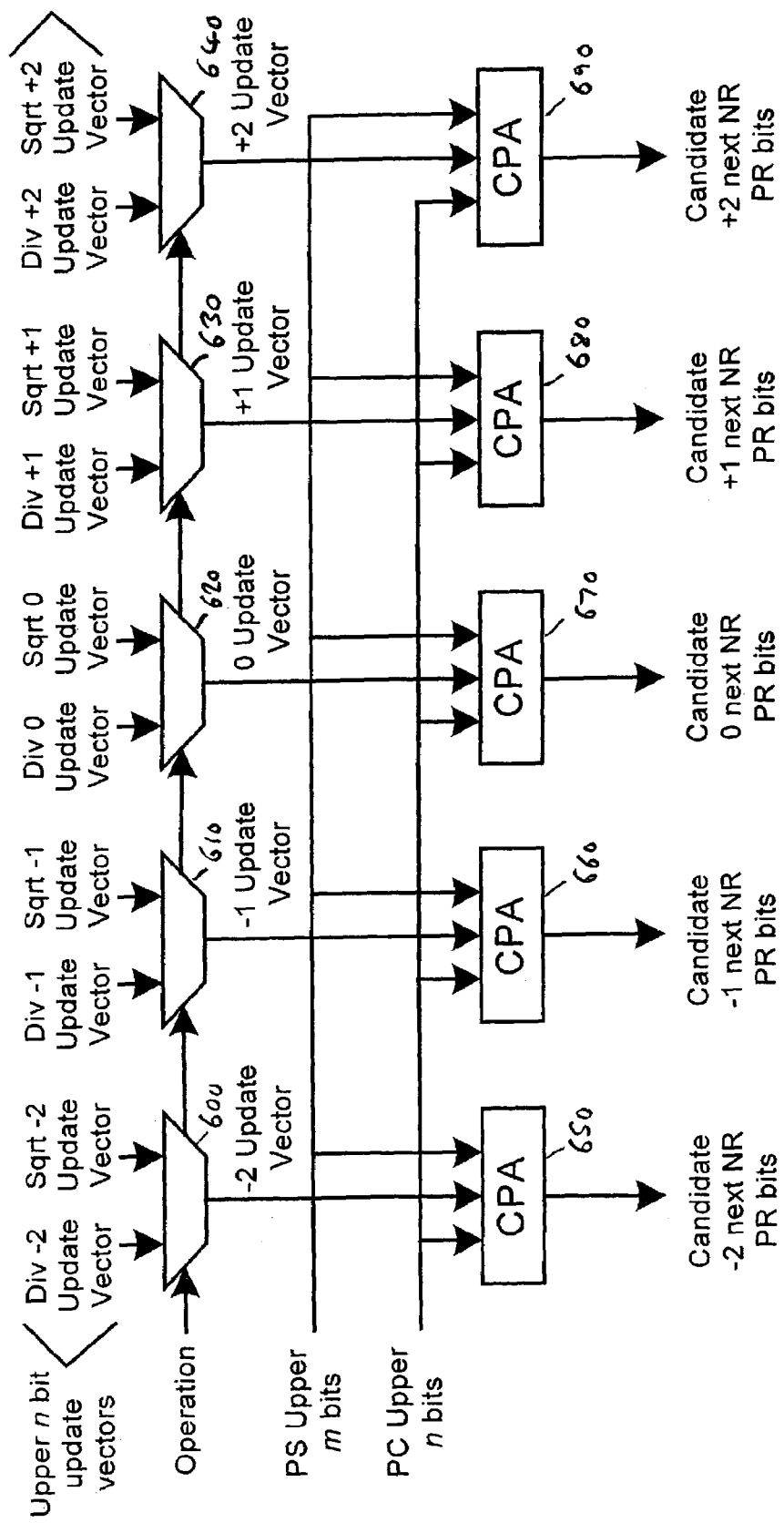
FIG. 6 is a diagram illustrating in more detail the construction of the partial remainder upper bits generation logic of FIG. 3.

As can be seen from FIGS. 6 and 8, the update vectors for the square root operation are input into corresponding adder circuits, in the first iteration, the carry propagate adders within the upper bits generation logic 370 receiving the upper n bits of the radicand, and the carry-save adder circuits within the update vector and carry-save adders logic 380 receiving the lower r bits of the radicand. Since the next root digit in the first iteration is set to a logic one value, this will ensure that the output of carry-propagate adder 680 is selected by the multiplexer 375, and the output of the carry-save adder 880 is selected by the multiplexer 385, these outputs defining the next residual which is returned to the registers 300, 310. The top n bits of the residual in non-redundant form are stored in the carry register 300.

In the second iteration, the row selection control signal used to drive the multiplexers 515, 525, 535 and 545 of FIG. 4 is arranged to always select the row identified in FIG. 5 as 12/16 to 13/16. The most significant n bits of the residual received over path 302 are then used by the next quotient select logic to select the next root digit. In preferred embodiments, it is only possible in this iteration that the next root digit will be either −2, −1 or 0. This next root digit is then used to drive the various multiplexers 375, 385, 410 and 420, resulting in the generation of an updated root and in the generation of a next residual.

During the third iteration the row selection control signal used to drive the multiplexers 515, 525, 535, 545 of FIG. 4 is driven dependent on the value of the root digit determined in the second iteration. In preferred embodiments, if the root digit determined in the second iteration was 0, then the row identified in FIG. 5 as $15/16$ to $16/16$ is selected, if the root digit was −1, then the row chosen in the third iteration is that identified as $12/16$ to $13/16$, and if the root digit was −2, then the row now selected is that indicated as $8/16$ to $9/16$ in FIG. 5. Then, the next quotient select logic 360 is arranged to generate the next root digit dependent on the most significant n bits of the input residual received over path 302. Again, this next root digit results in appropriate selection by the multiplexers 375, 385, 410 and 420 of a next residual and an updated root.

In the fourth and subsequent iterations the row selection signal in FIG. 4 is set to select a row from the lookup table based on the value of the radicand, it being appreciated that as the radicand is set for the entire process, this now results in the same row being selected for each subsequent iteration.

More particularly, the iterations after the third iteration use a row selected according to the tables set out below. These tables are indexed by the upper bits of the adjusted radicand. The adjustment of the radicand is based on the exponent. If the exponent is even the radicand is shifted to the right one place; if odd, it is shifted to the right two places. The tables are indexed by the upper 8 bits of the radicand significand before the adjustment.

If radicand exponent is odd (internal precision exponent lsb is 0):

TABLE 1A

| Range of [52:45] | Final Row |
|---|---|
| 128–161 | 8/16 |
| 162–199 | 9/16 |
| 200–241 | 10/16 |
| 242–255 | 11/16 |

If radicand exponent is even (internal precision exponent lsb is 1):

TABLE 1B

| Range of [52:45] | Final Row |
|---|---|
| 128–143 | 11/16 |
| 144–168 | 12/16 |
| 169–195 | 13/16 |
| 196–224 | 14/16 |
| 225–255 | 15/16 |

The process then proceeds as described earlier for the division operation, such that once a predetermined number of iterations have been completed, the result is deemed to be given by the final root output from the multiplexer 470, and the final residual output from the carry propagate adder 460 in combination with the non-redundant bits output from the register 430.

From the above description, it will appreciated that the apparatus of the preferred embodiment alleviates the critical path problem observed in the primary iterative cycle of prior art apparatus used to iteratively execute recurrence equations, such as those used to perform division or square root operations. As described in detail earlier, this benefit stems from the moving of the computation of the non-redundant upper bits of the next residual/next partial remainder to a position outside of the critical path.

Although a particular embodiment has been described herein, it will be apparent that the invention is not limited thereto, and that many modifications and additions thereto may be made within the scope of the invention. For example, various combinations of the features of the following dependent claims can be made with the features of the independent claims without departing from the scope of the present invention.

We claim:

1. A method of operating a data processing apparatus to perform a division operation to divide a dividend by a divisor, the division operation being implemented by iterative execution of a recurrence equation, in each iteration, execution of the recurrence equation causing a predetermined number of bits of a quotient, and a partial remainder, to be generated, the partial remainder generated in a previous iteration being used as an input for the current iteration, and in the first iteration the dividend forming the input partial remainder, the method comprising the steps of:
   (a) for a current iteration,
      (i) determining from the divisor and a most significant n bits of the input partial remainder a next quotient digit;
      (ii) generating, based on the input partial remainder, the divisor and the next quotient digit, a next partial remainder, the most significant n bits of the next partial remainder being generated in non-redundant form and the remaining bits of the next partial remainder being generated in redundant form;
      (iii) modifying the quotient, having regard to the next quotient digit, to produce an updated quotient;
   (b) iterating said steps (a)(i) to (a)(iii) until a predetermined condition is met, whereafter the result of the division operation is indicated by the updated quotient and any partial remainder existing after the final iteration.

2. A method as claimed in claim 1, wherein during a first iteration the method comprises the steps of:
   at said step (a)(i), determining from the divisor and a most significant n bits of the dividend a first quotient digit;
   at said step (a)(ii), generating, based on the dividend, the divisor and the first quotient digit, a partial remainder, the most significant n bits of the partial remainder being generated in non-redundant form and the remaining bits of the partial remainder being generated in redundant form;
   at said step (a)(iii), generating an initial quotient having regard to the first quotient digit.

3. A method as claimed in claim 1, wherein at said step (a)(i) the next quotient digit is selected from a predetermined range of values, and said step (a)(ii) comprises the steps of:
   (1) generating, for each possible value of the next quotient digit, a candidate next partial remainder; and
   (2) selecting as the next partial remainder the candidate next partial remainder corresponding to the next quotient digit determined at said step (a)(i).

4. A method as claimed in claim 3, wherein said step (a)(ii)(1) is performed at least partially in parallel with said step (a)(i).

5. A method as claimed in claim 1, wherein said step (a)(ii) comprises the step of generating the most significant n bits of the next partial remainder in non-redundant form independently from the generation of the remaining bits of the next partial remainder in redundant form.

6. A method as claimed in claim 1, wherein the redundant form is a carry-save form, such that at said step (a)(ii) the remaining bits of the next partial remainder are generated as a sequence of carry and save bits, the method further comprising the step of storing the carry and save bits of the next partial remainder in carry and save registers, respectively, prior to said step (b).

7. A method as claimed in claim 6, wherein the method further comprises the step of storing the most significant n bits of the next partial remainder in non-redundant form in the carry register prior to said step (b).

8. A method as claimed in claim 1, wherein said step (a)(i) comprises the steps of selecting the next quotient digit from a predetermined range of values dependent on the divisor and the most significant n bits of the input partial remainder.

9. A method as claimed in claim 8, wherein the selecting step is performed by selecting the next quotient digit from a lookup table.

10. A method as claimed in claim 9, wherein the selecting step is performed by selecting the next quotient digit from a subset of the lookup table associated with the divisor, the subset specifying for each of a number of ranges of values of the most significant n bits of the input partial remainder a corresponding value for the next quotient digit.

11. A method as claimed in claim 1, wherein said predetermined condition is that a predetermined number of iterations have been performed.

12. A method as claimed in claim 1, wherein said predetermined condition is that the partial remainder is less than or equal to a predetermined value.

13. A data processing apparatus operable to perform a division operation to divide a dividend by a divisor, the division operation being implemented by iterative execution of a recurrence equation, in each iteration, execution of the recurrence equation causing a predetermined number of bits of a quotient, and a partial remainder, to be generated, the partial remainder generated in a previous iteration being used as an input for the current iteration, and in the first iteration the dividend forming the input partial remainder, the data processing apparatus comprising:

quotient digit logic operable for a current iteration to determine from the divisor and a most significant n bits of the input partial remainder a next quotient digit;

partial remainder generation logic operable for a current iteration to generate, based on the input partial remainder, the divisor and the next quotient digit, a next partial remainder, the most significant n bits of the next partial remainder being generated in non-redundant form and the remaining bits of the next partial remainder being generated in redundant form;

quotient update logic operable for a current iteration to modify the quotient, having regard to the next quotient digit, to produce an updated quotient;

control logic operable to cause the iterations to continue until a predetermined condition is met, whereafter the result of the division operation is indicated by the updated quotient and any partial remainder existing after the final iteration.

14. A data processing apparatus as claimed in claim 13, wherein during a first iteration:

the quotient digit logic is operable to determine from the divisor and a most significant n bits of the dividend a first quotient digit;

the partial remainder generation logic is operable to generate based on the dividend, the divisor and the first quotient digit, a partial remainder, the most significant n bits of the partial remainder being generated in non-redundant form and the remaining bits of the partial remainder being generated in redundant form;

the quotient update logic is operable to generate an initial quotient having regard to the first quotient digit.

15. A data processing apparatus as claimed in claim 13, wherein the quotient digit logic is operable to determine the next quotient digit by selecting the next quotient digit from a predetermined range of values, and said partial remainder generation logic comprises:

candidate generation logic operable to generate, for each possible value of the next quotient digit, a candidate next partial remainder; and selection logic operable to select as the next partial remainder the candidate next partial remainder corresponding to the next quotient digit determined by the quotient digit logic.

16. A data processing apparatus as claimed in claim 15, wherein said candidate generation logic is operable to generate the candidate next partial remainders at least partially in parallel with the determination of the next quotient digit by said quotient digit logic.

17. A data processing apparatus as claimed in claim 13, wherein said partial remainder generation logic is operable to generate the most significant n bits of the next partial remainder in non-redundant form independently from the generation of the remaining bits of the next partial remainder in redundant form.

18. A data processing apparatus as claimed in claim 17, wherein the partial remainder generation logic comprises first generation logic operable to generate the most significant n bits of the next partial remainder in non-redundant form, and second generation logic operable to generate the remaining bits of the next partial remainder in redundant form.

19. A data processing apparatus as claimed in claim 18, wherein:

said first generation logic comprises first candidate generation logic operable to generate, for each possible value of the next quotient digit, candidate most significant n bits of the next partial remainder, and first selection logic operable to select as the most significant n bits of the next partial remainder the candidate most significant n bits of the next partial remainder corresponding to the next quotient digit determined by the quotient digit logic; and said second generation logic comprises second candidate generation logic operable to generate, for each possible value of the next quotient digit, candidate remaining bits of the next partial remainder, and second selection logic operable to select as the remaining bits of the next partial remainder the candidate remaining bits of the next partial remainder corresponding to the next quotient digit determined by the quotient digit logic.

20. A data processing apparatus as claimed in claim 19, wherein the redundant form is a carry-save form, such that said second generation logic is operable to generate the remaining bits of the next partial remainder as a sequence of carry and save bits, and the second candidate generation logic is a carry-save adder operable to generate the candidate remaining bits of the next partial remainder from the divisor and the carry and save bits of the partial remainder.

21. A data processing apparatus as claimed in claim 13, wherein the redundant form is a carry-save form, such that said partial remainder generation logic is operable to generate the remaining bits of the next partial remainder as a sequence of carry and save bits, the data processing apparatus further comprising a carry register and a save register operable to store the carry and save bits of the next partial remainder, respectively, prior to each iteration.

22. A data processing apparatus as claimed in claim 21, wherein the carry register is further operable to store, prior to each iteration, the most significant n bits of the next partial remainder generated by the partial remainder generation logic in non-redundant form.

23. A data processing apparatus as claimed in claim 13, wherein said quotient digit logic is operable to select the next quotient digit from a predetermined range of values dependent on the divisor and the most significant n bits of the input partial remainder.

24. A data processing apparatus as claimed in claim 23, wherein the quotient digit logic is operable to select the next quotient digit from a lookup table.

25. A data processing apparatus as claimed in claim 24, wherein the quotient digit logic is operable to select the next quotient digit from a subset of the lookup table associated with the divisor, the subset specifying for each of a number of ranges of values of the most significant n bits of the input partial remainder a corresponding value for the next quotient digit.

26. A data processing apparatus as claimed in claim 13, wherein said predetermined condition is that a predetermined number of iterations have been performed.

27. A data processing apparatus as claimed in claim 13, wherein said predetermined condition is that the partial remainder is less than or equal to a predetermined value.

28. A method of operating a data processing apparatus to perform a square root operation on a radicand, the square root operation being implemented by iterative execution of a recurrence equation, in each iteration, execution of the recurrence equation causing a predetermined number of bits of a root, and a residual, to be generated, the residual and the root generated in a previous iteration being used as an input for the current iteration, and in the first iteration the radicand forming the input residual, the method comprising the steps of:
   (a) for a current iteration,
      (i) determining from a most significant n bits of the input residual and an indication of the current iteration a next root digit;
      (ii) generating, based on the input residual, the input root, the next root digit and an indication of the current iteration, a next residual, the most significant n bits of the next residual being generated in non-redundant form and the remaining bits of the next residual being generated in redundant form;
      (iii) modifying the root, having regard to the next root digit, to produce an updated root;
   (b) iterating said steps (a)(i) to (a)(iii) until a predetermined condition is met, whereafter the result of the square root operation is indicated by the updated root and any residual existing after the final iteration.

29. A method as claimed in claim 28, wherein during a first iteration the method comprises the steps of:
   at said step (a)(i), setting a first root digit to a logic one value;
   at said step (a)(ii), generating, based on the radicand, the first root digit and an indication of the current iteration, a residual, the most significant n bits of the residual being generated in non-redundant form and the remaining bits of the residual being generated in redundant form;
   at said step (a)(iii), generating an initial root having regard to the first root digit.

30. A method as claimed in claim 28, wherein said step (a)(i) comprises the steps of selecting the next root digit from a lookup table, the lookup table comprising a plurality of rows, each row being arranged to specify for each of a number of ranges of values of the most significant n bits of the input residual a corresponding value for the next root digit.

31. A method as claimed in claim 30, wherein during a second iteration the method comprises the steps of:
   at said step (a)(i), selecting a predetermined row from the lookup table, and determining from the most significant n bits of the input residual the next root digit as indicated by that predetermined row.

32. A method as claimed in claim 31, wherein during a third iteration the method comprises the steps of:
   at said step (a)(i), selecting a row from the lookup table based on the value of the root digit determined for the preceding iteration, and determining from the most significant n bits of the input residual the next root digit as indicated by that selected row.

33. A method as claimed in claim 32, wherein during a fourth or subsequent iteration the method comprises the steps of:
   at said step (a)(i), selecting a row from the lookup table based on the value of the radicand, and determining from the most significant n bits of the input residual the next root digit as indicated by that selected row.

34. A method as claimed in claim 28, wherein at said step (a)(i) the next root digit is selected from a predetermined range of values, and said step (a)(ii) comprises the steps of:
   (1) generating, for each possible value of the next root digit, a candidate next residual; and
   (2) selecting as the next residual the candidate next residual corresponding to the next root digit determined at said step (a)(i).

35. A method as claimed in claim 34, wherein said step (a)(ii)(1) is performed at least partially in parallel with said step (a)(i).

36. A method as claimed in claim 28, wherein said step (a)(ii) comprises the step of generating the most significant n bits of the next residual in non-redundant form independently from the generation of the remaining bits of the next residual in redundant form.

37. A method as claimed in claim 28, wherein the redundant form is a carry-save form, such that at said step (a)(ii) the remaining bits of the next residual are generated as a sequence of carry and save bits, the method further comprising the step of storing the carry and save bits of the next residual in carry and save registers, respectively, prior to said step (b).

38. A method as claimed in claim 37, wherein the method further comprises the step of storing the most significant n bits of the next residual in non-redundant form in the carry register prior to said step (b).

39. A method as claimed in claim 28, wherein said predetermined condition is that a predetermined number of iterations have been performed.

40. A method as claimed in claim 28, wherein said predetermined condition is that the residual is less than or equal to a predetermined value.

41. A data processing apparatus operable to perform a square root operation on a radicand, the square root operation being implemented by iterative execution of a recurrence equation, in each iteration, execution of the recurrence equation causing a predetermined number of bits of a root, and a residual, to be generated, the residual and the root generated in a previous iteration being used as an input for the current iteration, and in the first iteration the radicand forming the input residual, the data processing apparatus comprising:

root digit logic operable for a current iteration to determine from a most significant n bits of the input residual and an indication of the current iteration a next root digit;

residual generation logic operable for a current iteration to generate, based on the input residual, the input root, the next root digit and an indication of the current iteration, a next residual, the most significant n bits of the next residual being generated in non-redundant form and the remaining bits of the next residual being generated in redundant form;

root update logic operable for a current iteration to modify the root, having regard to the next root digit, to produce an updated root;

control logic operable to cause the iterations to continue until a predetermined condition is met, whereafter the result of the square root operation is indicated by the updated root and any residual existing after the final iteration.

42. A data processing apparatus as claimed in claim 41, wherein during a first iteration:
said root digit logic is operable to set a first root digit to a logic one value;
said residual generation logic is operable to generate, based on the radicand, the first root digit and an indication of the current iteration, a residual, the most significant n bits of the residual being generated in non-redundant form and the remaining bits of the residual being generated in redundant form;
said root update logic is operable to generate an initial root having regard to the first root digit.

43. A data processing apparatus as claimed in claim 41, wherein said root digit logic is operable to select the next root digit from a lookup table, the lookup table comprising a plurality of rows, each row being arranged to specify for each of a number of ranges of values of the most significant n bits of the input residual a corresponding value for the next root digit.

44. A data processing apparatus as claimed in claim 43, wherein during a second iteration:
said root digit logic is operable to select a predetermined row from the lookup table, and to determine from the most significant n bits of the input residual the next root digit as indicated by that predetermined row.

45. A data processing apparatus as claimed in claim 44, wherein during a third iteration:
said root digit logic is operable to select a row from the lookup table based on the value of the root digit determined for the preceding iteration, and to determine from the most significant n bits of the input residual the next root digit as indicated by that selected row.

46. A data processing apparatus as claimed in claim 45, wherein during a fourth or subsequent iteration:
said root digit logic is operable to select a row from the lookup table based on the value of the radicand, and to determine from the most significant n bits of the input residual the next root digit as indicated by that selected row.

47. A data processing apparatus as claimed in claim 41, wherein the root digit logic is operable to determine the next root digit by selecting the next root digit from a predetermined range of values, and said residual generation logic comprises:
candidate generation logic operable to generate, for each possible value of the next root digit, a candidate next residual; and selection logic operable to select as the next residual the candidate next residual corresponding to the next root digit determined by the root digit logic.

48. A data processing apparatus as claimed in claim 47, wherein said candidate generation logic is operable to generate the candidate next residuals at least partially in parallel with the determination of the next root digit by said root digit logic.

49. A data processing apparatus as claimed in claim 41, wherein said residual generation logic is operable to generate the most significant n bits of the next residual in non-redundant form independently from the generation of the remaining bits of the next residual in redundant form.

50. A data processing apparatus as claimed in claim 49, wherein the residual generation logic comprises first generation logic operable to generate the most significant n bits of the next residual in non-redundant form, and second generation logic operable to generate the remaining bits of the next residual in redundant form.

51. A data processing apparatus as claimed in claim 50, wherein:
said first generation logic comprises first candidate generation logic operable to generate, for each possible value of the next root digit, candidate most significant n bits of the next residual, and first selection logic operable to select as the most significant n bits of the next residual the candidate most significant n bits of the next residual corresponding to the next root digit determined by the root digit logic; and
said second generation logic comprises second candidate generation logic operable to generate, for each possible value of the next root digit, candidate remaining bits of the next residual, and second selection logic operable to select as the remaining bits of the next residual the candidate remaining bits of the next residual corresponding to the next root digit determined by the root digit logic.

52. A data processing apparatus as claimed in claim 51, wherein the redundant form is a carry-save form, such that said second generation logic is operable to generate the remaining bits of the next residual as a sequence of carry and save bits, and the second candidate generation logic is a carry-save adder operable to generate the candidate remaining bits of the next residual from the carry and save bits of the residual and an indication of the current iteration.

53. A data processing apparatus as claimed in claim 41, wherein the redundant form is a carry-save form, such that said residual generation logic is operable to generate the remaining bits of the next residual as a sequence of carry and save bits, the data processing apparatus further comprising a carry register and a save register operable to store the carry and save bits of the next residual, respectively, prior to each iteration.

54. A data processing apparatus as claimed in claim 53, wherein the carry register is further operable to store, prior to each iteration, the most significant n bits of the next residual generated by the residual generation logic in non-redundant form.

55. A data processing apparatus as claimed in claim 41, wherein said predetermined condition is that a predetermined number of iterations have been performed.

56. A data processing apparatus as claimed in claim 41, wherein said predetermined condition is that the residual is less than or equal to a predetermined value.

57. A method of operating a data processing apparatus to perform an operation on an operand in order to generate a result, the operation being implemented by iterative execution of a recurrence equation, in each iteration, execution of the recurrence equation causing a predetermined number of bits of the result and a residual to be generated, the residual generated in a previous iteration being used as an input for the current iteration, and in the first iteration the residual comprising the operand, the method comprising the steps of:

(a) for a current iteration,
   (i) determining, having regard to a most significant n bits of the input residual, a next result digit;
   (ii) generating, having regard to the input residual and the next result digit, a next residual, the most significant n bits of the next residual being generated in non-redundant form and the remaining bits of the next residual being generated in redundant form;
   (iii) modifying the result, having regard to the next result digit, to produce an updated result;
(b) iterating said steps (a)(i) to (a)(iii) until a predetermined condition is met, whereafter the result is indicated by the updated result and any residual existing after the final iteration.

58. A method as claimed in claim 57, wherein the operation is a division operation, the operand is a dividend, a further operand is a divisor, the result is a quotient, the next result digit is a next quotient digit, and the residual is a partial remainder, the method comprising the steps of:
   at said step (a)(i), determining from the divisor and a most significant n bits of the input partial remainder the next quotient digit;
   at said step (a)(ii), generating, based on the input partial remainder, the divisor and the next quotient digit, a next partial remainder, the most significant n bits of the next partial remainder being generated in non-redundant form and the remaining bits of the next partial remainder being generated in redundant form;
   at said step (a)(iii), modifying the quotient, having regard to the next quotient digit, to produce an updated quotient;
   at said step (b), iterating said steps (a)(i) to (a)(iii) until a predetermined condition is met, whereafter the result of the division operation is indicated by the updated quotient and any partial remainder existing after the final iteration.

59. A method as claimed in claim 57, wherein the operation is a square root operation, the operand is a radicand, the result is a root, and the next result digit is a next root digit, the method comprising the steps of:
   at said step (a)(i), determining the next root digit from a most significant n bits of the input residual and an indication of the current iteration;
   at said step (a)(ii), generating, based on the input residual, the input root, the next root digit and an indication of the current iteration, a next residual, the most significant n bits of the next residual being generated in non-redundant form and the remaining bits of the next residual being generated in redundant form;
   at said step (a)(iii), modifying the root, having regard to the next root digit, to produce an updated root;
   at said step (b), iterating said steps (a)(i) to (a)(iii) until a predetermined condition is met, whereafter the result of the square root operation is indicated by the updated root and any residual existing after the final iteration.

60. A data processing apparatus operable to perform an operation on an operand in order to generate a result, the operation being implemented by iterative execution of a recurrence equation, in each iteration, execution of the recurrence equation causing a predetermined number of bits of the result and a residual to be generated, the residual generated in a previous iteration being used as an input for the current iteration, and in the first iteration the residual comprising the operand, the data processing apparatus comprising:
   result digit logic operable for a current iteration to determine, having regard to a most significant n bits of the input residual, a next result digit;
   residual generation logic operable for a current iteration to generate, having regard to the input residual and the next result digit, a next residual, the most significant n bits of the next residual being generated in non-redundant form and the remaining bits of the next residual being generated in redundant form;
   result update logic operable for a current iteration to modify the result, having regard to the next result digit, to produce an updated result; and
   control logic operable to cause the iterations to continue until a predetermined condition is met, whereafter the result is indicated by the updated result and any residual existing after the final iteration.

61. A data processing apparatus as claimed in claim 60, wherein the operation is a division operation, the operand is a dividend, a further operand is a divisor, the result is a quotient, the next result digit is a next quotient digit, and the residual is a partial remainder, and wherein:
   said result digit logic is operable for a current iteration to determine from the divisor and a most significant n bits of the input partial remainder a next quotient digit;
   said residual generation logic is operable for a current iteration to generate, based on the input partial remainder, the divisor and the next quotient digit, a next partial remainder, the most significant n bits of the next partial remainder being generated in non-redundant form and the remaining bits of the next partial remainder being generated in redundant form;
   said result update logic is operable for a current iteration to modify the quotient, having regard to the next quotient digit, to produce an updated quotient;
   said control logic is operable to cause the iterations to continue until a predetermined condition is met, whereafter the result of the division operation is indicated by the updated quotient and any partial remainder existing after the final iteration.

62. A data processing apparatus as claimed in claim 60, wherein the operation is a square root operation, the operand is a radicand, the result is a root, and the next result digit is a next root digit, and wherein:
   said result digit logic is operable for a current iteration to determine from a most significant n bits of the input residual and an indication of the current iteration a next root digit;
   said residual generation logic is operable for a current iteration to generate, based on the input residual, the input root, the next root digit and an indication of the current iteration, a next residual, the most significant n bits of the next residual being generated in non-redundant form and the remaining bits of the next residual being generated in redundant form;
   said result update logic is operable for a current iteration to modify the root, having regard to the next root digit, to produce an updated root;
   said control logic is operable to cause the iterations to continue until a predetermined condition is met, whereafter the result of the square root operation is indicated by the updated root and any residual existing after the final iteration.

* * * * *